(12) United States Patent
Inagaki

(10) Patent No.: US 8,459,289 B2
(45) Date of Patent: Jun. 11, 2013

(54) ELECTRO-PNEUMATIC POSITIONER AND ELECTRO-PNEUMATIC CONVERTING DEVICE

(75) Inventor: Yohsuke Inagaki, Tokyo (JP)

(73) Assignee: Azbil Corporation, Tokyo (JP)

(*) Notice: Subject to any disclaimer, the term of this patent is extended or adjusted under 35 U.S.C. 154(b) by 255 days.

(21) Appl. No.: 13/075,324

(22) Filed: Mar. 30, 2011

(65) Prior Publication Data

US 2011/0240138 A1 Oct. 6, 2011

(30) Foreign Application Priority Data

Mar. 31, 2010 (JP) ................................. 2010-081150

(51) Int. Cl.
*F15B 5/00* (2006.01)
(52) U.S. Cl.
USPC ...................... 137/85; 251/30.05; 251/129.04
(58) Field of Classification Search
USPC ........... 137/14, 84, 85, 86, 484.4, 487, 487.5, 137/557; 251/30.02, 30.05, 129.04; 700/282, 700/287, 289, 301; 73/37, 37.5, 37.9, 168, 73/865.9
See application file for complete search history.

(56) References Cited

U.S. PATENT DOCUMENTS

| | | | | | |
|---|---|---|---|---|---|
| 2,935,077 | A | * | 5/1960 | Keyser | 137/82 |
| 3,219,046 | A | * | 11/1965 | Waugh | 137/8 |
| 3,285,266 | A | * | 11/1966 | De Zurik | 137/86 |
| 4,388,942 | A | * | 6/1983 | Mito | 137/85 |
| 4,430,886 | A | * | 2/1984 | Rood | 73/37 |
| 4,481,967 | A | * | 11/1984 | Frick | 137/85 |
| 4,668,948 | A | * | 5/1987 | Merkel | 340/606 |
| 5,197,328 | A | * | 3/1993 | Fitzgerald | 73/168 |
| 5,251,148 | A | * | 10/1993 | Haines et al. | 700/282 |
| 5,451,373 | A | * | 9/1995 | Lewis et al. | 422/82.13 |
| 5,526,838 | A | * | 6/1996 | Robert | 137/12 |
| 5,537,856 | A | * | 7/1996 | Kelbrick et al. | 73/37 |
| 5,540,081 | A | * | 7/1996 | Takeda et al. | 73/37 |
| 5,549,137 | A | * | 8/1996 | Lenz et al. | 137/486 |
| 6,348,098 | B1 | * | 2/2002 | McLoughlin et al. | 118/313 |
| 6,460,775 | B1 | * | 10/2002 | Duan et al. | 239/11 |
| 6,907,082 | B1 | * | 6/2005 | Loechner | 375/257 |
| 8,307,845 | B2 | * | 11/2012 | Kouchi et al. | 137/486 |

FOREIGN PATENT DOCUMENTS

| | | |
|---|---|---|
| JP | 6-294401 A | 10/1994 |
| JP | 9-287158 A | 11/1997 |
| JP | 11-311217 A | 11/1999 |

* cited by examiner

*Primary Examiner* — John Rivell
*Assistant Examiner* — Matthew W Jellett
(74) *Attorney, Agent, or Firm* — Troutman Sanders LLP

(57) ABSTRACT

An operating mode of an electro-pneumatic converting unit is stored in advance in an electro-pneumatic converting unit operating mode storing unit. A blockage location identifying function is provided in a calculating unit. The operating unit monitors the magnitude of shift and the direction of shift of the control output, relative to the nozzle back pressure, through the blockage location identifying function, and identifies whether a blockage has occurred in the fixed orifice or the nozzle/flapper mechanism based on the magnitude of shift and direction of shift of the control output, relative to the nozzle back pressure, and based on the operating mode of the electro-pneumatic converting unit, stored in the electro-pneumatic converting unit operating mode storing unit. An electro-pneumatic converting unit operating mode identifying function may be provided in the calculating unit, and the operating mode of the electro-pneumatic converting unit may be identified through this function, and the identification result may be stored in the electro-pneumatic converting unit operating mode storing unit.

10 Claims, 9 Drawing Sheets

FIG. 5

| Positive Operating Mode | Location of Blockage |
|---|---|
| Shift in Positive Direction | Fixed Orifice |
| Shift in the Negative Direction | Nozzle/Flapper Mechanism |

FIG. 6

| Negative Operating Mode | Location of Blockage |
|---|---|
| Shift in Positive Direction | Nozzle/Flapper Mechanism |
| Shift in the Negative Direction | Fixed Orifice |

FIG. 8

Electro-Pneumatic Converting Unit Operating Mode Identifying Logic

| Direction of Change of Control Output K | Direction of Change in Nozzle Back Pressure Pn | Operating Mode of the Electro-Pneumatic Converting Unit |
|---|---|---|
| + | + | Positive |
| - | - | Positive |
| + | - | Negative |
| - | + | Negative |

ELECTRO-PNEUMATIC POSITIONER AND ELECTRO-PNEUMATIC CONVERTING DEVICE

CROSS REFERENCE TO RELATED APPLICATIONS

The present application claims priority under 35 U.S.C. §119 to Japanese Patent Application No. 2010-081150, filed Mar. 31, 2010, which is incorporated herein by reference.

FIELD OF TECHNOLOGY

The present invention relates to an electro-pneumatic positioner and electro-pneumatic converting device for controlling the degree of opening of a regulating valve by converting an electric signal into a pneumatic pressure signal.

BACKGROUND OF THE INVENTION

Conventionally, electro-pneumatic positioners have been provided in control valves, where the valve opening of the control valve is controlled by the electro-pneumatic positioner. This electro-pneumatic positioner includes a calculating unit for calculating a deviation between a control valve opening setting value sent from a higher-level device and an actual opening value that is fed back from the control valve, to generate, as a control output, an electric signal in accordance with this deviation; an electro-pneumatic converting device for converting, into a nozzle back-pressure of a nozzle/flapper mechanism that is operated by air that is supplied through a fixed orifice from a pneumatic pressure supply source, the control output generated by the calculating unit; and a pilot relay for amplifying the nozzle back-pressure, converted by the electro-pneumatic converting unit and outputting the result, as an output pneumatic pressure, to an operating device for the control valve.

In this electro-pneumatic positioner, air from a pneumatic pressure supplying source is directed through a fixed orifice to a nozzle, strikes a flapper, and is exhausted. Fine dust (or mist) that is included within the air from the pneumatic pressure supplying source gradually accumulates in the narrow fixed orifice, which is the narrowest place in the air flow path, or in the gap between the nozzle and the flapper (the "nozzle gap") where the amount of accumulation increases with the amount of time of operation. When the amount of accumulation exceeds a tolerable value, then the device falls into a non-operating state.

There are also fixed orifice and nozzle/flapper mechanism in electro-pneumatic converting devices that produce a control output from the deviation between a set opening value from a higher-level device and a measured value for the pneumatic pressure outputted to the operating device of the control valve are as well, and thus the same problem occurs as in the electro-pneumatic positioner set forth above.

Given this, consideration has been given to promoting maintenance prior to falling into the non-operating state, due to the accumulation of dust, through the electro-pneumatic positioner or electro-pneumatic converting device itself being aware that the amount of dust accumulated is large, and providing notification to a maintenance technician, either in the workplace or remotely.

For example, in Japanese Unexamined Patent Application Publication H-6-294401 ("JP '401"), a feedback signal and a deviation signal, or a difference between signals related thereto, are processed to produce a difference signal, and a warning is outputted to the outside if this difference signal exceeds a reference value that has been set in advance.

Moreover, in the Japanese Unexamined Patent Application Publication H11-311217 ("JP '217"), a dirt detecting nozzle/flapper is connected in parallel to the nozzle/flapper mechanism to the supply air duct in order to detect by proxy the dirt in the nozzle/flapper mechanism of the electro-pneumatic converting unit, where the nozzle back pressure of the dirt-detecting nozzle/flapper is measured, the amount of dirt in the electro-pneumatic converting unit is calculated from the nozzle back pressure that is measured, and that amount of dirt is displayed.

However, while it is possible to detect the occurrence of dirt that cannot be ignored (that is, a blockage) someplace in the fixed orifice or the nozzle/flapper mechanism using the methods set forth in JP '401 and JP '217, above, is not possible to specify which of these it was in which the dirt (blockage) occurred.

The present invention is to resolve this type of problem, and the object thereof is to provide an electro-pneumatic positioner and electro-pneumatic converting device able to specify whether the blockage has occurred in the fixed orifice or in the nozzle/flapper mechanism.

SUMMARY OF THE INVENTION

In order to achieve such an object, the electro-pneumatic positioner according to the present invention includes control output generating device for calculating a deviation between a valve opening setting value sent from a higher-level device and an actual opening value that is fed back from a control valve that is subject to control, to generate, as a control signal, an electric signal in accordance with the deviation; electro-pneumatic converting device for converting a control output that is produced by the control output generating device into a nozzle back pressure of a nozzle/flapper mechanism that operates through air that is supplied through a fixed orifice from a pneumatic pressure supplying source; and nozzle back pressure amplifying device for amplifying a nozzle back pressure, converted by the electro-pneumatic converting device and outputting to an operating device of the control valve as an output pneumatic pressure; wherein: blockage location identifying device for identifying a location wherein a blockage has occurred, either the fixed orifice or the nozzle/flapper mechanism, based on a magnitude of shift and on a direction of shift of the control output generated by the control output generating device relative to the nozzle back pressure converted by the electro-pneumatic converting device.

Moreover, an electro-pneumatic converting device according to the present invention has control output generating means for calculating a deviation between a set opening signal sent from a higher-level device and a measurement signal of an output pneumatic pressure to an operating device of a control valve that is subject to control, to generate, as a control signal, an electric signal in accordance with the deviation; electro-pneumatic converting device for converting a control output that is produced by the control output generating device into a nozzle back pressure of a nozzle/flapper mechanism that operates through air that is supplied through a fixed orifice from a pneumatic pressure supplying source; and nozzle back pressure amplifying device for amplifying a nozzle back pressure, converted by the electro-pneumatic converting device and outputting to an operating device of the control valve as an output pneumatic pressure; wherein: blockage location identifying device for identifying a location wherein a blockage has occurred, either the fixed orifice or the nozzle/flapper mechanism, based on a magnitude of shift and on a direction of shift of the control output generated by the control output generating device relative to the nozzle back pressure converted by the electro-pneumatic converting device.

Given this invention, where the blockage has occurred, either the fixed orifice or the nozzle/flapper mechanism, is evaluated based on the magnitude of shift, and the direction thereof, in the control output in relation to the nozzle back pressure.

For example, in the present invention, when the operating mode of the electro-pneumatic converting device is the positive operating mode, then if the magnitude of shift in the control output in relation to the nozzle back pressure exceeds a specific value, then if the magnitude of shift is in the positive direction, it is concluded that the blockage occurred in the fixed orifice, but if the magnitude of shift is in the negative direction, then it is concluded that the blockage occurred in the nozzle/flapper mechanism.

For example, in the present invention, when the operating mode of the electro-pneumatic converting device is the negative operating mode, then if the magnitude of shift in the control output in relation to the nozzle back pressure exceeds a specific value, then if the magnitude of shift is in the positive direction, it is concluded that the blockage occurred in the nozzle/flapper mechanism, but if the magnitude of shift is in the negative direction, then it is concluded that the blockage occurred in the fixed orifice.

Note that when it comes to the operating modes of the electro-pneumatic converting means, the operating mode is termed the positive operating mode if the nozzle back pressure increases with an increase in the control output, and the operating mode is termed the negative operating mode if the nozzle back pressure decreases with an increase in the control output. The operating mode of the electro-pneumatic converting device may be stored in advance, or electro-pneumatic conversion identifying device for identifying the operating mode of the electro-pneumatic converting device may be provided, and the identification results may be stored as the operating mode of the electro-pneumatic converting means.

The present invention makes it possible to evaluate whether the blockage occurred in the fixed orifice or in the nozzle/flapper mechanism based on the magnitude of shift and on the direction thereof of the control output relative to the nozzle back pressure, to specify whether a blockage has occurred in the fixed orifice or in the nozzle/flapper mechanism, to thereby effect an improvement in maintainability.

BRIEF DESCRIPTION OF THE DRAWINGS

FIG. 5 is a diagram illustrating a blockage location identifying logic when the operating mode of the electro-pneumatic converting unit is the positive operating mode.

FIG. 6 is a diagram illustrating a blockage location identifying logic when the operating mode of the electro-pneumatic converting unit is the negative operating mode.

FIG. 8 is a diagram illustrating the operating mode identifying logic within the electro pneumatic converting unit in the electro-pneumatic positioner.

DETAILED DESCRIPTION OF THE PRESENT INVENTION

Examples of the present invention are explained below in detail, based on the drawings.

Figure 1:
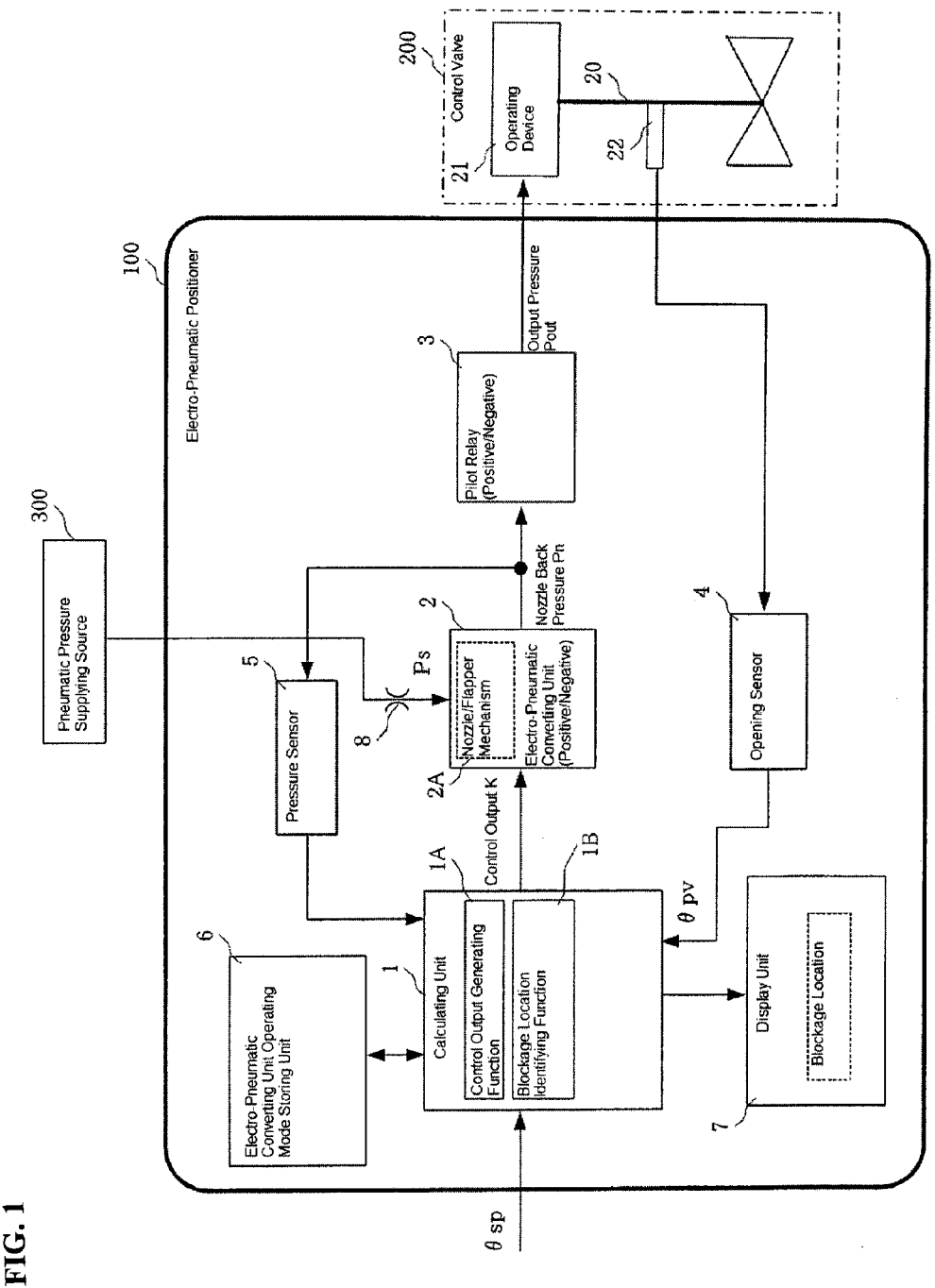
FIG. 1 is a block diagram illustrating an example of an electro-pneumatic positioner according to the present invention.

An Example when the Operating Mode of the Electro-Pneumatic Converting Unit is Stored in Advance FIG. 1 is a block diagram illustrating an example of an electro-pneumatic positioner according to the present invention. In this figure, 100 is an electro-pneumatic positioner according to the present invention and 200 is a control valve wherein the opening thereof is controlled by the electro-pneumatic positioner 100. The control valve 200 has an operating device 21 that drives a valve rod 20, and a feedback mechanism 22 that feeds back the amount of dislocation in the upward or downward direction at the valve rod 20.

This electro-pneumatic positioner 100 has a calculating unit 1 for calculating a deviation between a control valve opening setting value θsp sent from a higher-level device (not shown) and an actual opening value θpv that is fed back from the control valve 200, to generate, as a control output K, an electric signal in accordance with this deviation; an electro-pneumatic converting unit 2 for converting, into a nozzle back-pressure Pn of a nozzle/flapper mechanism 2A that is operated by air Ps that is supplied through a fixed orifice 8 from a pneumatic pressure supply source 300, the control output K generated by the calculating unit 1; a pilot relay 3 for amplifying the nozzle back-pressure Pn, converted by the electro-pneumatic converting unit 2 and outputting the result, as an output pneumatic pressure Pout, to an operating device 21 for the control valve 200; a valve opening sensor 4; a pressure sensor 5; an electro-pneumatic converting unit operating mode storing unit 6; and a display unit 7.

The valve opening sensor 4 detects the degree of opening of the control valve 200 from the amount of dislocation of the valve rod 20 fed back by the feedback mechanism 22, and sends the detected valve opening to the calculating unit 1 as the actual opening value θpv. The pressure sensor 5 detects the pressure value of the nozzle back-pressure Pn from the electro-pneumatic converting unit 2 and sends it to the calculating unit 1.

Figure 2:
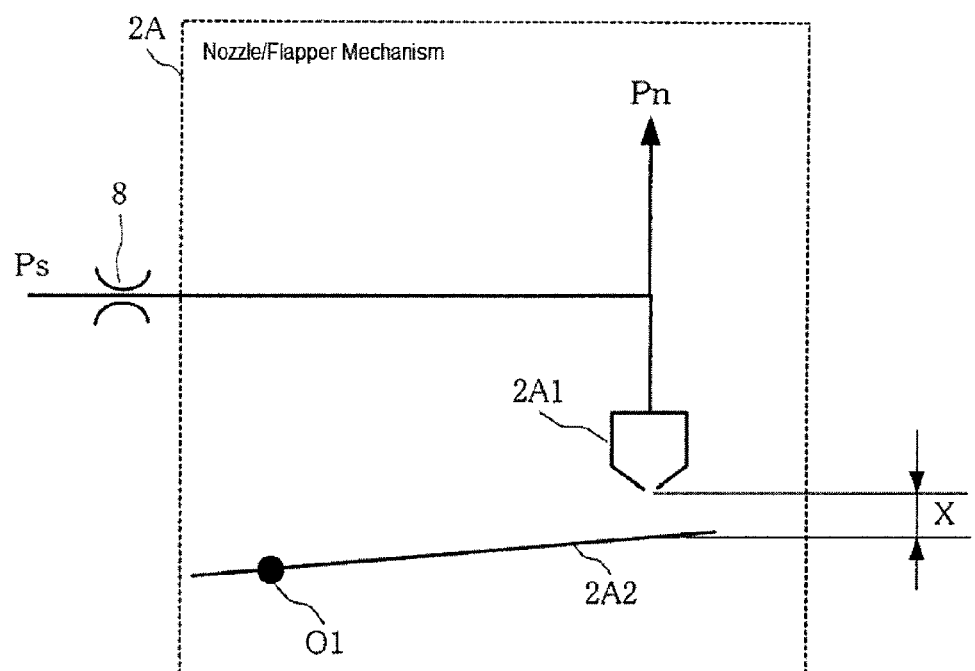
FIG. 2 is a diagram illustrating the critical components of a nozzle/flapper mechanism within the electro-pneumatic converting unit in the electro-pneumatic positioner.

In the electro-pneumatic converting unit 2, a nozzle/flapper mechanism 2A, as illustrated in FIG. 2, is provided with a nozzle 2A1 for exhausting air Ps that is supplied through the fixed orifice 8, and a flapper 2A2 that swings centered on a support point O1. The electro-pneumatic converting unit 2, upon inputting of the control output K from the calculating unit 1, applies, to a magnetic excitation coil (not shown), an electric current in accordance with the control output K, to thereby change the intensity of the magnetic field. Doing so changes the gap (the nozzle gap) X of the nozzle 2A1 by causing the flapper 2A2 to swing, to thereby change the nozzle back pressure Pn.

The operating mode of the electro-pneumatic converting unit 2 is stored in advance in the electro-pneumatic converting unit operating mode storing unit 6. The operating modes of the electro-pneumatic converting unit 2 are the positive operating mode, wherein the nozzle back pressure Pn becomes larger as the control output K is larger, and the negative operating mode, wherein the nozzle back pressure Pn becomes smaller as the control output K is larger, where the operating mode is correlated with the actual operating mode of the electro-pneumatic converting unit 2 and stored in advance in the operating mode storing unit 6.

A calculating unit 1 is achieved through hardware having a processor, a storing portion, and the like, and a program that achieves the various functions working in cooperation with the hardware, where, in addition to the control output generating function 1A that generates the control output K, there is also, as a function that is unique to example, a blockage location identifying function 1B.

Blockage Location Identifying Function

The calculating unit 1 monitors the magnitude of shift, and direction of shift, of the controlling output K relation to the nozzle back pressure Pn through the blockage location identifying function 1B, and evaluates, based on the magnitude of shift and direction of shift of the controlling output K in relation to the nozzle back pressure Pn, and on the operating mode of the electro-pneumatic converting unit 2 that is stored in the electro-pneumatic converting unit operating mode storing unit 6, whether the blockage has occurred in the fixed orifice 8 or the nozzles/flapper mechanism 2A.

Operating Mode of the Electro-Pneumatic Converting Unit and the Relationship between the Control Output and Nozzle Back Pressure Depending on the Blockage Location when the Electro-Pneumatic Converting Unit is in the Positive Operating Mode When the electro-pneumatic converting unit 2 is in the positive operating mode, then when the control output K is large, the nozzle gap X is small in the nozzle/flapper mechanism 2A, with the effect that the nozzle back pressure Pn is large.

Figure 3:
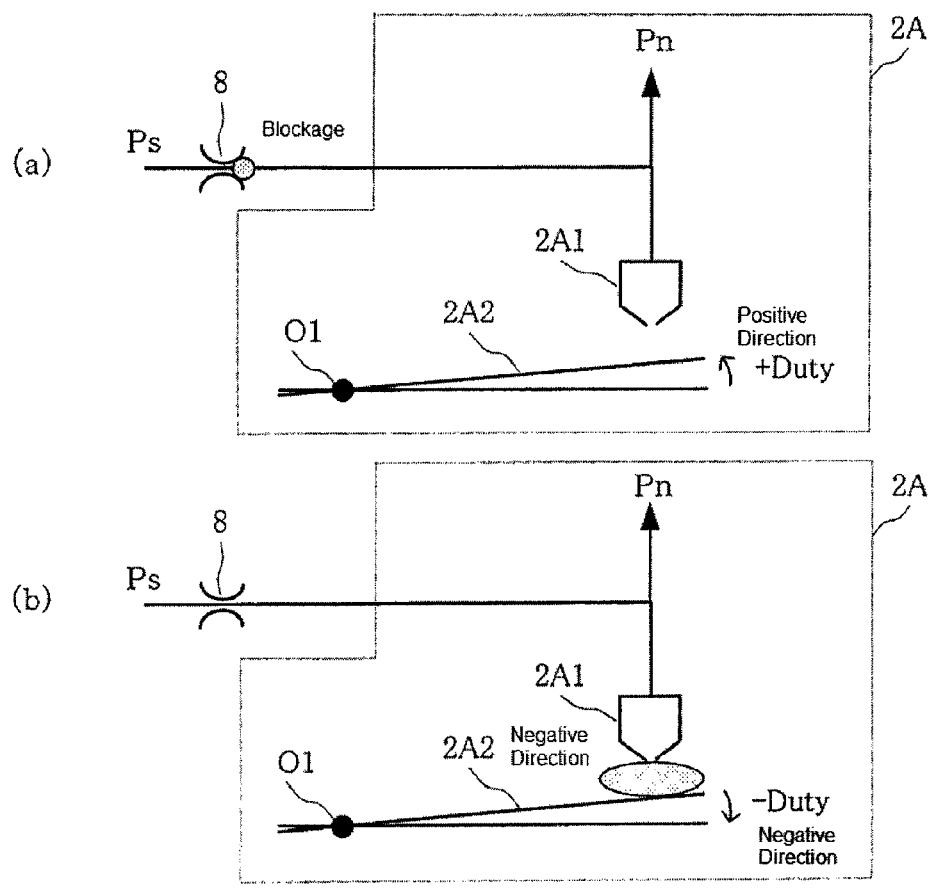
FIG. 3 is a diagram for explaining the relationship between the control output and the nozzle back pressure depending on the location of the blockage when the electro-pneumatic converting unit is in the positive operating mode.

When there is a blockage in the fixed orifice 8 (referencing FIG. 3 (a)), the nozzle back pressure Pn, which is on the downstream side, falls. At this point, the nozzle back pressure Pn is low relative to the control output K, and the duty of the control output K will shift in the positive direction to increase the nozzle back pressure Pn.

In contrast, when a blockage occurs in the nozzle/flapper mechanism 2A (between the nozzle and the flapper), then (referencing FIG. 3 (d)) the nozzle back pressure Pn, which is of the upstream side thereof, increases. At this point, the nozzle back pressure Pn is high relative to the control output K, and the duty of the control output K shifts in the negative direction to decrease the nozzle back pressure Pn.

When the Electro-Pneumatic Converting Unit is in the Negative Operating Mode

When the electro-pneumatic converting unit 2 is in the negative operating mode, then when the control output K is large, the nozzle gap X is large in the nozzle/flapper mechanism 2A, with the effect that the nozzle back pressure Pn is small.

Figure 4:
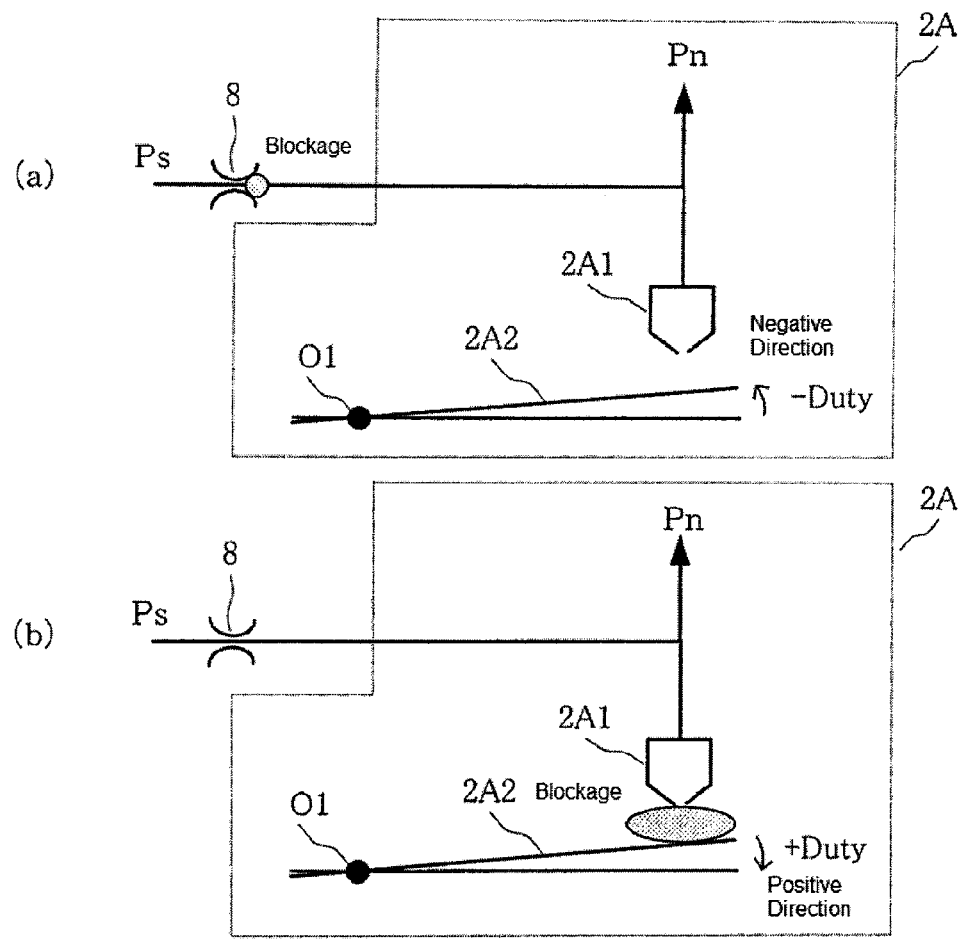
FIG. 4 is a diagram for explaining the relationship between the control output and the nozzle back pressure depending on the location of the blockage when the electro-pneumatic converting unit is in the negative operating mode.

When there is a blockage in the fixed orifice 8 (referencing FIG. 4 (a)), the nozzle back pressure Pn, which is on the downstream side, falls. At this point, the nozzle back pressure Pn is low relative to the control output K, and the duty of the control output K shifts in the negative direction to increase the nozzle back pressure Pn.

In contrast, when a blockage occurs in the nozzle/flapper mechanism 2A (between the nozzle and the flapper), then (referencing FIG. 4 (d)) the nozzle back pressure Pn, which is of the upstream side thereof, increases. At this point, the nozzle back pressure Pn is high relative to the control output K, and the duty of the control output K shifts in the positive direction to decrease the nozzle back pressure Pn.

Evaluation of the Blockage Location when the Operating Mode of the Electro-Pneumatic Converting Unit is the Positive Operating Mode At this point, the operating mode of the electro-pneumatic converting unit 2 is the positive operating mode, and that the operating mode of the electro-pneumatic converting unit 2 is the positive operating mode is stored also in the electro-pneumatic converting unit operating mode storing unit 6.

In this case, the calculating unit 1 concludes, from the detail that is stored in the electro-pneumatic converting unit operating mode storing unit 6 by the blockage location identifying function 1B, that the operating mode of the electro-pneumatic converting unit 2 is the positive operating mode, and if the magnitude of shift of the control output K relative to the nozzle back pressure Pn exceeds a specific value, concludes that a blockage has occurred in the fixed orifice 8 if the magnitude/direction of the shift is the positive direction, and concludes that the blockage has occurred in the nozzle/flapper mechanism 2A if the magnitude/direction of the shift is in the negative direction. (See FIG. 5.)

That is, if the operating mode of the electro-pneumatic converting unit 2 is the positive operating mode, then when a blockage occurs in the fixed orifice 8, then, as illustrated in FIG. 3 (a), the control output K relative to the nozzle back pressure Pn shifts in the positive direction, and the magnitude of that shift increases commensurate with the size of the blockage. Given this, if the magnitude of the shift in the control output K in the positive direction exceeds a specific value, then it is concluded that a blockage has occurred in the fixed orifice 8. The evaluation result is displayed on the screen of the display unit 7.

Additionally, if the operating mode of the electro-pneumatic converting unit 2 is the positive operating mode, then when a blockage occurs in the nozzle/flapper mechanism 2A, then, as illustrated in FIG. 3 (b), the control output K relative to the nozzle back pressure Pn shifts in the negative direction, and the magnitude of that shift increases commensurate with the size of the blockage. Given this, if the magnitude of the shift in the control output K in the negative direction exceeds a specific value, then it is concluded that a blockage has occurred in nozzle/flapper mechanism 2A. The identification results displayed on a screen of a display unit 7.

Evaluation of the Blockage Location when the Operating Mode of the Electro-Pneumatic Converting Unit is the Negative Operating Mode At this point, the operating mode of the electro-pneumatic converting unit 2 is the negative operating mode, and that the operating mode of the electro-pneumatic converting unit 2 is the negative operating mode is stored also in the electro-pneumatic converting unit operating mode storing unit 6.

In this case, the calculating unit 1 concludes, from the detail that is stored in the electro-pneumatic converting unit operating mode storing unit 6 by the blockage location identifying function 1B, that the operating mode of the electro-pneumatic converting unit 2 is the negative operating mode, and if the magnitude of shift of the control output K relative to the nozzle back pressure Pn exceeds a specific value, concludes that a blockage has occurred in the nozzle/flapper mechanism 2A if the magnitude/direction of the shift is the positive direction, and concludes that the blockage has occurred in the fixed orifice 8 if the magnitude/direction of the shift is in the negative direction. (See FIG. 6.)

That is, if the operating mode of the electro-pneumatic converting unit 2 is the negative operating mode, then when a blockage occurs in the fixed orifice 8, then, as illustrated in FIG. 4 (a), the control output K relative to the nozzle back pressure Pn shifts in the negative direction, and the magnitude of that shift increases commensurate with the size of the blockage. Given this, if the magnitude of the shift in the control output K in the negative direction exceeds a specific value, then it is concluded that a blockage has occurred in the fixed orifice 8. The identification results displayed on a screen of a display unit 7.

Additionally, if the operating mode of the electro-pneumatic converting unit 2 is the negative operating mode, then when a blockage occurs in the nozzle/flapper mechanism 2A, then, as illustrated in FIG. 4 (b), the control output K relative to the nozzle back pressure Pn shifts in the positive direction, and the magnitude of that shift increases commensurate with the size of the blockage. Given this, if the magnitude of the shift in the control output K in the positive direction exceeds a specific value, then it is concluded that a blockage has occurred in nozzle/flapper mechanism 2A. The identification results displayed on a screen of a display unit 7.

Figure 7:
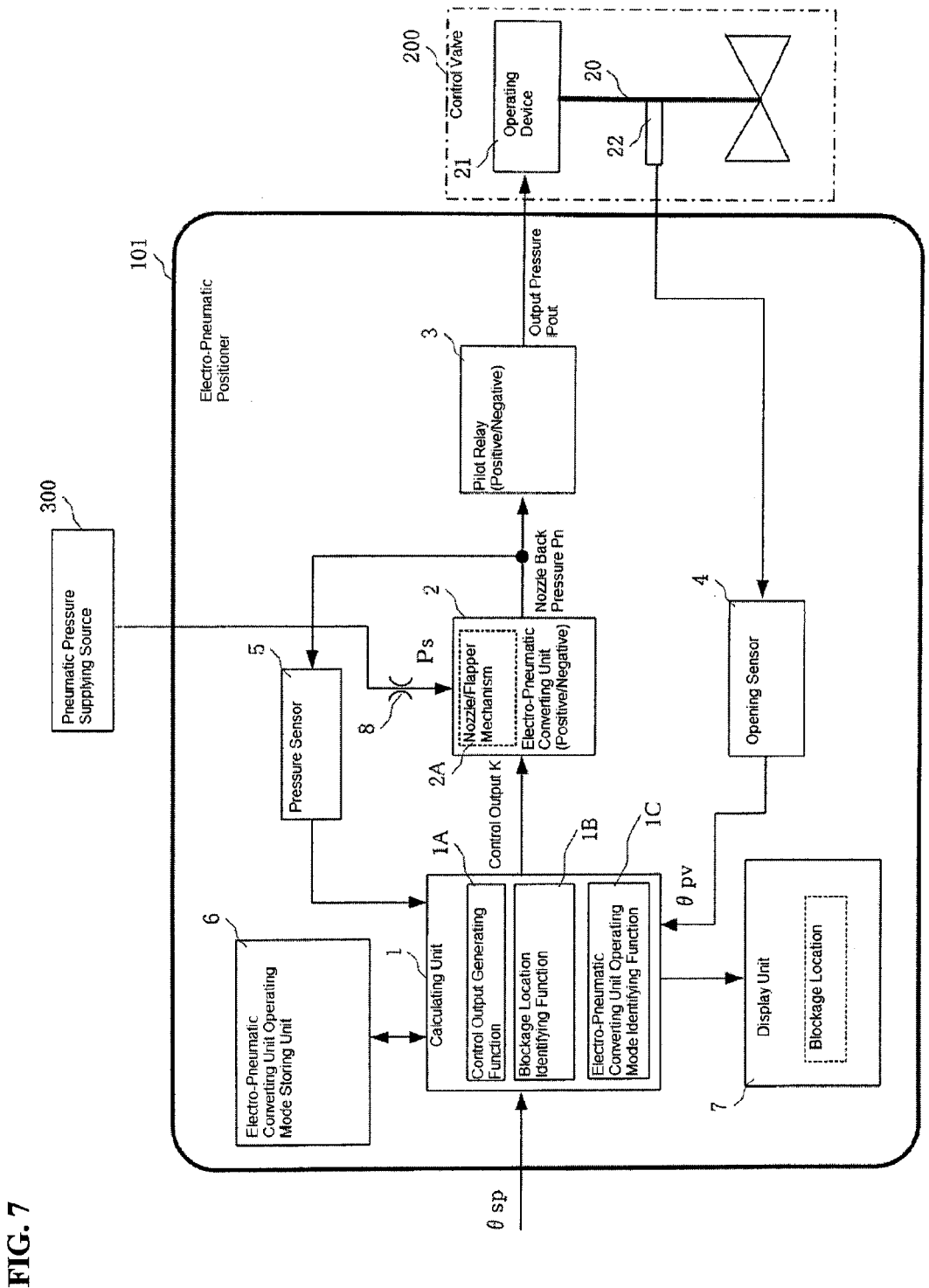
FIG. 7 is a block diagram illustrating another example of an electro-pneumatic positioner according to the present invention.

Example when the Operating Mode of the Electro-Pneumatic Converting Unit is Evaluated FIG. 7 is a block diagram illustrating another example of an electro-pneumatic positioner according to the present invention. In the electro-pneumatic positioner 100 illustrated in FIG. 1, the operating triode of the electro-pneumatic converting unit 2 was stored in advance in the electro-pneumatic converting unit operating mode storing unit 6.

In contrast, in the electro-pneumatic positioner 101 illustrated in FIG. 7, an electro-pneumatic converting unit operating mode identifying function 1C is provided in the calculating unit 1, where the operating mode of the electro-pneumatic converting unit 2 is evaluated by this electro-pneumatic converting unit operating mode identifying function 1C, and the evaluation result is stored in the electro-pneumatic converting unit operating mode storing unit 6.

In this electro-pneumatic positioner 101, the calculating unit 1 monitors the changes in the nozzle back pressure Pn relative to the changes in the control output K by the electro-pneumatic converting unit operating mode identifying function 1C, with the conclusion that the operating mode of the electro-pneumatic converting unit 2 is the positive operating mode if the direction of change of the control output K and the direction of change of the nozzle back pressure Pn are the same direction, and the conclusion that the operating mode of the electro-pneumatic converting unit 2 is the negative operating mode if the direction of change of the control output K and the direction of change of the nozzle back pressure Pn are different. Additionally, the operating mode thus evaluated is stored in the electro-pneumatic converting unit operating mode storing unit 6 as the current operating mode of the electro-pneumatic converting unit 2.

FIG. 8 illustrates the identifying logic for the operating mode of the electro-pneumatic converting unit by the electro-pneumatic converting unit operating mode identifying function 1C. As can be understood by this identifying logic, the calculating unit 1 identifies the operating mode of the electro-pneumatic converting unit 2, through the electro-pneumatic converting unit operating mode identifying function 1C, as the positive operating mode if the direction of change of the control output K is "+" and the direction of change of the nozzle back pressure Pn is "+", or if the direction of change of the control output K is "−" and the direction of change of the nozzle back pressure Pn is "−" In contrast, the operating mode of the electro-pneumatic converting unit 2 is identified as the negative operating mode if the direction of change of the control output K is "+" and the direction of change of the nozzle back pressure Pn is "−", or if the direction of change of the control output K is "−" and the direction of change of the nozzle back pressure Pn is "+".

In this example, the electro-pneumatic positioner 101 itself is able to identify the operating mode of the built-in electro-pneumatic converting unit 2, and the identification result is stored in the electro-pneumatic converting unit operating mode storing unit 6, thus making it possible to always evaluate the location of a blockage accurately. For example, when an electro-pneumatic converting unit wherein the operating mode is switchable is used as the electro-pneumatic converting unit 2 (referencing, for example, Japanese Unexamined Patent Application Publication H9-287158), then it is possible for the operating mode of the electro-pneumatic converting unit 2 to be changed manually at some point. In such a case, it is necessary to update the operating mode that is stored in the electro-pneumatic converting unit operating mode storing unit 6; however, even if this updating were forgotten in such a case, the electro-pneumatic positioner 101 itself would identify automatically the operating mode of the electro-pneumatic converting unit 2, and update the operating mode that is stored in the electro-pneumatic converting unit operating mode storing unit 6, thus making it possible to eliminate human error.

Figure 9:
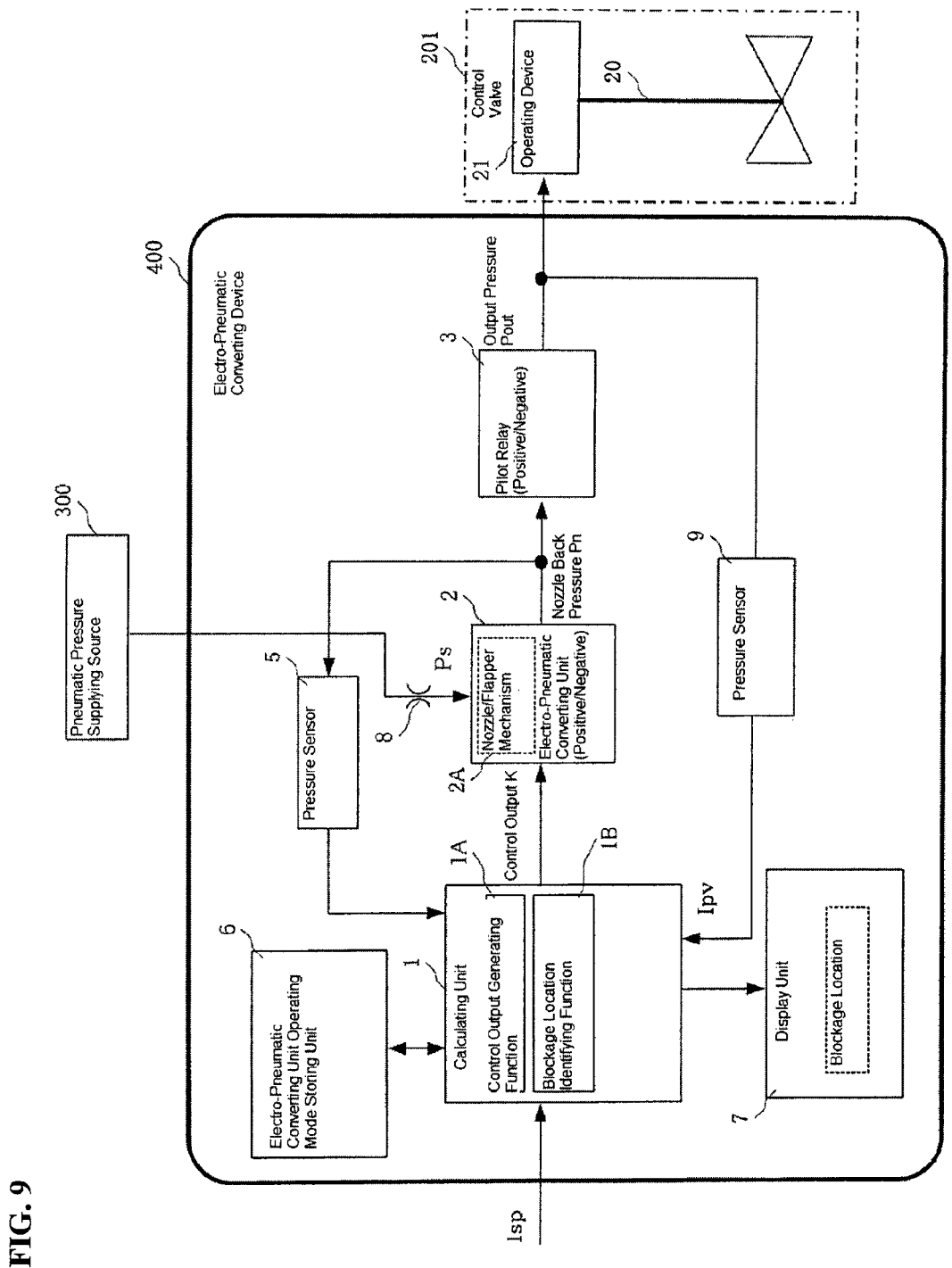
FIG. 9 is a block diagram illustrating a further example of an electro-pneumatic converting device according to the present invention.

Example when the Operating Mode of the Electro-Pneumatic Converting Unit is Stored in Advance FIG. 9 is a block diagram illustrating a further example according to the present invention. In this figure: 400 is an electro-pneumatic converting device according to the present invention, and 201 is a control valve wherein the degree of opening thereof is controlled by this electro-pneumatic converting device 400. The control valve 201 has an operating device 21 for driving a valve rod 20, but is not provided with the feedback mechanism 22 as illustrated in FIG. 1.

Additionally, this electro-pneumatic converting device 400 is provided with a pressure sensor 9 that detects the pressure value of the output pneumatic pressure Pout to the operating device 21 of the control valve 201 from the pilot relay 3, where a signal that indicates the pressure value detected by the pressure sensor 9 is sent to the calculating unit 1 as the measurement signal Ipv of the output pneumatic pressure Pout.

In this electro-pneumatic converting device 400, the calculating unit 1 calculates the deviation between the set opening signal Isp that is sent from the higher-level device (not shown) and the measurement signal Ipv of the output pneumatic pressure Pout that is sent from the pressure sensor 9, and generates, as the control output K, an electric signal in accordance with the deviation. This control output K is sent to the electro-pneumatic converting unit 2, and is converted into a nozzle back pressure Pn.

In this electro-pneumatic converting device 400, as with the electro-pneumatic positioner 100 illustrated in FIG. 1, the calculating unit 1 is equipped with a blockage location identifying function 1B, and, as with the electro-pneumatic positioner 100 illustrated in FIG. 1, the location of the occurrence of a blockage at either the fixed orifice 8 or at the nozzle/flapper mechanism 2A is identified.

Figure 10:
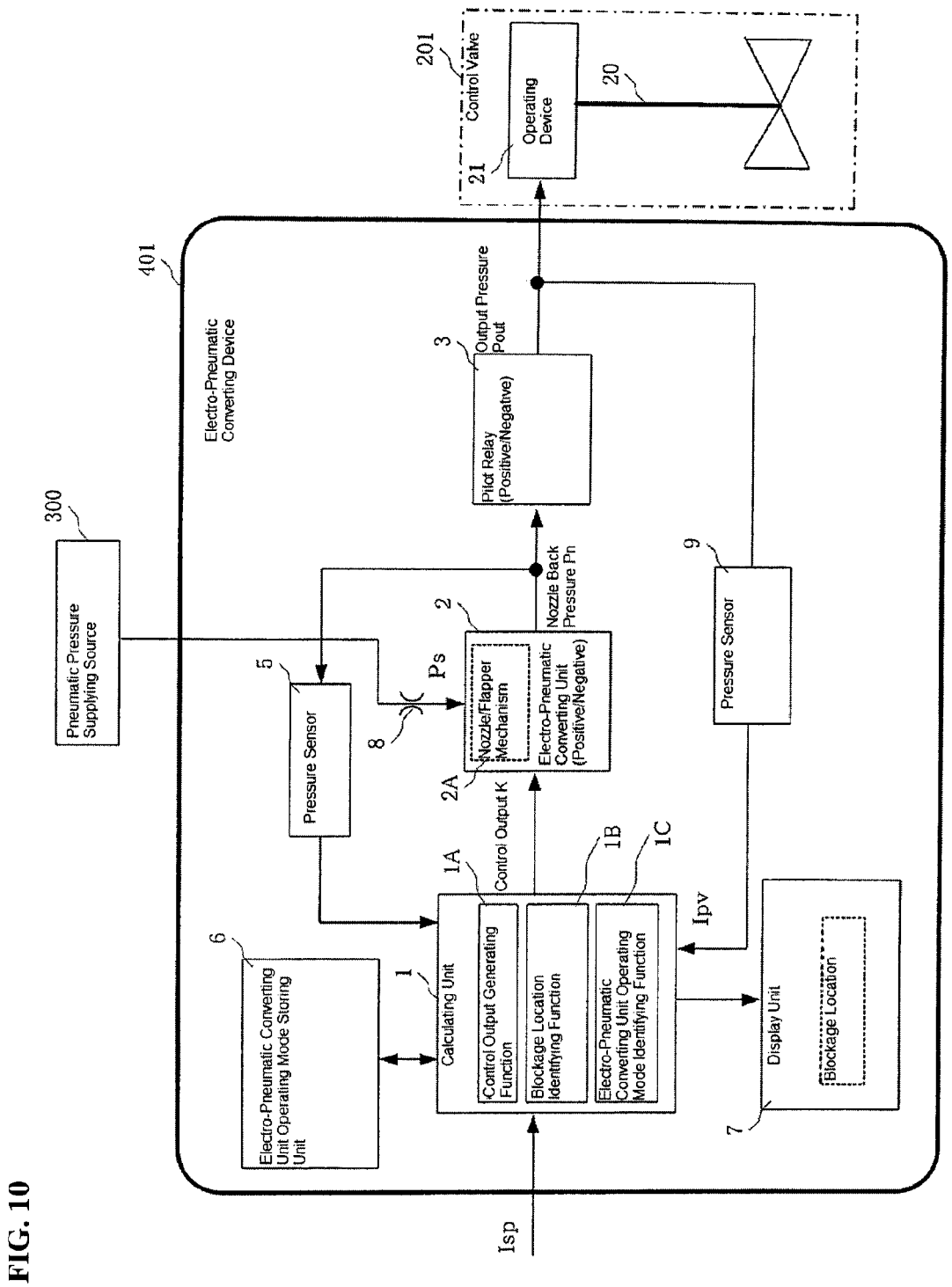
FIG. 10 is a block diagram illustrating yet another example of an electro-pneumatic converting device according to the present invention.

Example when the Operating Mode of the Electro-Pneumatic Converting Unit is Evaluated FIG. 10 is a block diagram illustrating yet another example of an electro-pneumatic converting device according to the present invention. In the electro-pneumatic converting device 400 illustrated in FIG. 9, the operating mode of the electro-pneumatic converting unit 2 was stored in advance in the electro-pneumatic converting unit operating triode storing unit 6.

In contrast, in the electro-pneumatic converting device 401 illustrated in FIG. 10, an electro-pneumatic converting unit operating mode identifying function 1C is provided in the calculating unit 1, where the operating mode of the electro-pneumatic converting unit 2 is evaluated by this electro-pneumatic converting unit operating mode identifying function 1C, and the evaluation result is stored in the electro-pneumatic converting unit operating mode storing unit 6.

In this electro-pneumatic converting device 401, the calculating unit 1 monitors the changes in the nozzle back pressure Pn relative to the changes in the control output K by the electro-pneumatic converting unit operating triode identifying function 1C, with the conclusion that the operating mode of the electro-pneumatic converting unit 2 is the positive operating mode if the direction of change of the control output K and the direction of change of the nozzle back pressure Pn are the same direction, and the conclusion that the operating mode of the electro-pneumatic converting unit 2 is the negative operating mode if the direction of change of the control output K and the direction of change of the nozzle back pressure Pn are different. Additionally, the operating mode thus evaluated is stored in the electro-pneumatic converting unit operating mode storing unit 6 as the current operating mode of the electro-pneumatic converting unit 2, In this electro-pneumatic converting device 401 as well, as with the electro-pneumatic converting device 400 illustrated in FIG. 9, a blockage location identifying function 1B is provided in the calculating unit 1, and, as with the electro-pneumatic converting device 400 illustrated in FIG. 9, whether the blockage has occurred in the fixed orifice 8 or the nozzle/flapper mechanism 2A is identified.

As can be understood from the explanation above, in the electro-pneumatic positioners 100 and 101 and the electro-pneumatic converting devices 400 and 401 according to the examples, the location at which a blockage occurs is identified as either at the fixed orifice 8 or the nozzle/flapper mechanism 2A based on the magnitude of shift, and the direction of shift, of a control output K relative to a nozzle back pressure Pn, where the evaluation result is displayed on a screen of a display unit 7. As a result, the maintenance technician is able to specify, on the screen of the display unit 7, where a blockage has occurred, either at the fixed orifice 8 or in the nozzle/flapper mechanism 2A, enabling an improvement in maintainability.

Additionally, in the present example, if the electro-pneumatic converting unit 2 is contained within an explosionproof container and the fixed orifice 8 can be installed/removed from the outside of the explosionproof case, then if the blockage occurs within the fixed orifice 8, then the procedure is easy. That is, when the blockage location is specified as being the fixed orifice 8, the fixed orifice 8 may be removed and cleaned to eliminate the blockage, and then can be reinstalled. In this case, there is no need to open the explosionproof container, thus making it possible to perform the procedure easily.

The electro-pneumatic positioner and electro-pneumatic converting device in the present invention, as an electro-pneumatic positioner and electro-pneumatic converting device for converting an electric signal into an electro-pneumatic pressure signal to control the opening of a control valve, can be used in a variety of fields such as process control.

The invention claimed is:

1. An electro-pneumatic positioner, comprising:
   a control output generating device calculating a deviation between a valve opening setting value sent from a higher-level device and an actual opening value that is fed back from a control valve that is subject to control, to generate, as a control signal, an electric signal in accordance with the deviation;
   an electro-pneumatic converting device converting a control output produced by the control output generating device into a nozzle back pressure of a nozzle/flapper mechanism that operates through air that is supplied through a fixed orifice from a pneumatic pressure supplying source; and
   a nozzle back pressure amplifying device for amplifying a nozzle back pressure, converted by the electro-pneumatic converting device and outputting to an operating device of the control valve as an output pneumatic pressure; wherein:
   a blockage location identifying device for identifying a location wherein a blockage has occurred, either the fixed orifice or the nozzle/flapper mechanism, based on a magnitude of shift and on a direction of shift of the control output generated by the control output generating device relative to the nozzle back pressure converted by the electro-pneumatic converting device.

2. The electro-pneumatic positioner as set forth in claim 1, further comprising:
   an electro-pneumatic converting device operating mode storing device storing, as the operating mode of the electro-pneumatic converting device, either a positive mode wherein the nozzle back pressure becomes large as the control output becomes large, or a negative operating mode wherein the nozzle back pressure becomes small as the control output becomes large; wherein:
   the blockage location identifying device evaluates where a blockage has occurred, either the fixed orifice or the nozzle/flapper mechanism, based on the magnitude of shift and direction of shift of a control output generated by the control output generating device, in relation to a nozzle back pressure converted by the electro-pneumatic converting means, and on the operating mode for the electro-pneumatic converting device, stored in the electro-pneumatic converting device operating mode storing device.

3. The electro-pneumatic positioner as set forth in claim 2, further comprising:
   an electro-pneumatic conversion device operating mode identifying device for identifying the operating mode of the electro-pneumatic converting device;
   wherein the electro-pneumatic converting device operating mode storing device stores the identification result by the electro-pneumatic conversion device operating mode identifying device, as the operating mode of the electro-pneumatic converting device.

4. The electro-pneumatic positioner as set forth in claim 1, wherein the blockage location identifying device is configured to:
   identify, when the operating mode of the electro-pneumatic converting device is the positive operating mode, that a blockage has occurred in the fixed orifice if the magnitude of shift of the control output that is generated by the control output generating means relative to a nozzle back pressure that is converted by the electro-pneumatic converting device is greater than a specific threshold value and the magnitude/direction of shift is in the positive direction, and identifies the occurrence of the blockage in the nozzle/flapper mechanism if the magnitude/direction of shift is in the negative direction.

5. The electro-pneumatic positioner as set forth in claim 1, wherein the blockage location identifying device is configured to:
identify, when the operating mode of the electro-pneumatic converting device is the negative operating mode, that a blockage has occurred in the nozzle/flapper mechanism if the magnitude of shift of the control output generated by the control output generating device relative to a nozzle back pressure converted by the electro-pneumatic converting device is greater than a specific threshold value and the magnitude/direction of shift is in the positive direction, and identifies the occurrence of the blockage in the fixed orifice if the magnitude/direction of shift is in the negative direction.

6. An electro-pneumatic convening device comprising:
a control output generating device for calculating a deviation between a set opening signal sent from a higher-level device and a measurement signal of an output pneumatic pressure to an operating device of a control valve that is subject to control, to generate, as a control signal, an electric signal in accordance with the deviation;
an electro-pneumatic converting device converting a control output produced by the control output generating device into a nozzle back pressure of a nozzle/flapper mechanism that operates through air that is supplied through a fixed orifice from a pneumatic pressure supplying source; and
a nozzle back pressure amplifying device amplifying a nozzle back pressure, converted by the electro-pneumatic converting device and outputting to an operating device of the control valve as an output pneumatic pressure; wherein:
a blockage location identifying device identifying a location wherein a blockage has occurred, either the fixed orifice or the nozzle/flapper mechanism, based on a magnitude of shift and on a direction of shift of the control output generated by the control output generating device relative to the nozzle back pressure converted by the electro-pneumatic convening device.

7. This electro-pneumatic converting device as set forth in claim 6, comprising further:
an electro-pneumatic converting device operating mode storing device for storing, as the operating mode of the electro-pneumatic converting device, either a positive mode wherein the nozzle back pressure becomes large as the control output becomes large, or a negative operating mode wherein the nozzle back pressure becomes small as the control output becomes large; wherein:
the blockage location identifying device evaluates where a blockage has occurred, either the fixed orifice or the nozzle/flapper mechanism, based on the magnitude of shift and direction of shift of a control output generated by the control output generating device, in relation to a nozzle back pressure converted by the electro-pneumatic converting device, and on the operating mode for the electro-pneumatic converting device, stored in the electro-pneumatic converting device operating mode storing device.

8. The electro-pneumatic converting device as set forth in claim 7, comprising:
an electro-pneumatic conversion device operating mode identifying device identifying the operating mode of the electro-pneumatic converting device; wherein:
the electro-pneumatic converting device operating mode storing device store the identification result by the electro-pneumatic conversion device operating mode identifying device, as the operating mode of the electro-pneumatic converting device.

9. The electro-pneumatic converting device as set forth in claim 6, wherein:
the blockage location evaluating device identifies, when the operating mode of the electro-pneumatic converting device is the positive operating mode, that a blockage has occurred in the fixed orifice if the magnitude of shift of the control output generated by the control output generating device relative to a nozzle back pressure that is converted by the electro-pneumatic converting device is greater than a specific threshold value and the magnitude/direction of shift is in the positive direction, and identifies the occurrence of the blockage in the nozzle/flapper mechanism if the magnitude/direction of shift is in the negative direction.

10. The electro-pneumatic converting device as set forth in claim 6, wherein:
the blockage location identifying device identifies, when the operating mode of the electro-pneumatic converting device is the negative operating mode, that a blockage has occurred in the nozzle/flapper mechanism if the magnitude of shift of the control output generated by the control output generating device relative to a nozzle back pressure that is converted by the electro-pneumatic converting device is greater than a specific threshold value and the magnitude/direction of shift is in the positive direction, and identifies the occurrence of the blockage in the fixed orifice if the magnitude/direction of shift is in the negative direction.

* * * * *